Aug. 8, 1961

P. C. FLEMING 2,995,684

PROTECTIVE SYSTEM FOR INDUCTIVE LOAD

Filed Dec. 20, 1956

INVENTOR.
Paul C. Fleming.
BY
Hiram Cooke

ATTORNEY.

United States Patent Office 2,995,684
Patented Aug. 8, 1961

2,995,684
PROTECTIVE SYSTEM FOR INDUCTIVE LOAD
Paul C. Fleming, Fort Worth, Tex., assignor to Gulf Oil Corporation, Pittsburgh, Pa., a corporation of Pennsylvania
Filed Dec. 20, 1956, Ser. No. 629,556
3 Claims. (Cl. 317—58)

The present invention relates to a method of and apparatus for interrupting a supply of electrical energy to a reactive load upon the power consumption of the load falling below a normal rate of power consumption. More specifically, the principles of the present invention have applicability to interrupting the supply of electrical energy to an induction motor when the load carried by the motor falls below a normal value.

The method and apparatus of the instant invention is related to new and useful improvements in the construction of conventional single-phase and poly-phase relays such as commercially produced (by General Electric Company and Westinghouse Electric Corporation) and the application of such improved relays to the interruption of the supply of electrical energy to an induction motor when the load carried by such motor drops to a value in the range of about 75 percent to about 50 percent of the full load. Broadly, the present invention involves the method of operating an alternating current electrical system of the class wherein the voltage coil of an induction power relay is connected between a pair of power leads of a reactive load and wherein the current coil of the relay is in series with a power lead of the load, such method comprising the step of adjusting the phase angle between the current in the current coil and the current in the voltage coil to be such that the sine of the phase angle is substantially zero during normal power consumption by the load. The preferred manner of adjusting the phase angle between the currents in the current coil and the voltage coil is by suitable adjustment of the phase angle between the current and the voltage in the voltage coil. Ordinarily, where the method of the invention is practiced in conjunction with conventional type CW relays, such adjustment of the phase angle between the voltage and the current in the voltage coil is accomplished by increasing the resistance to the flow of current through the voltage coil.

In greater detail, the apparatus of the present invention involves an alternating current electrical system of the class wherein the voltage coil of an induction power relay is connected between a pair of power leads of a reactive load and the current coil of the relay is in series with a power lead of the load, with the relay including a disc subject to a torque equal in magnitude and sense to the product of the currents in the coils and the sine of the phase angle between the currents, and the improvement of providing means in series with the voltage coil that causes the sine of the phase angle between the currents in the coils to be substantially zero upon a normal rate of power consumption by the reactive load, together with means for interrupting the supply of power to the load upon the disc being subjected to a torque corresponding to the power consumption by the load being reduced a fixed amount below the normal rate of power consumption. The invention will be best understood in the light of the following description of a preferred embodiment thereof taken in conjunction with the accompanying drawings illustrative thereof, wherein:

Figure 1:
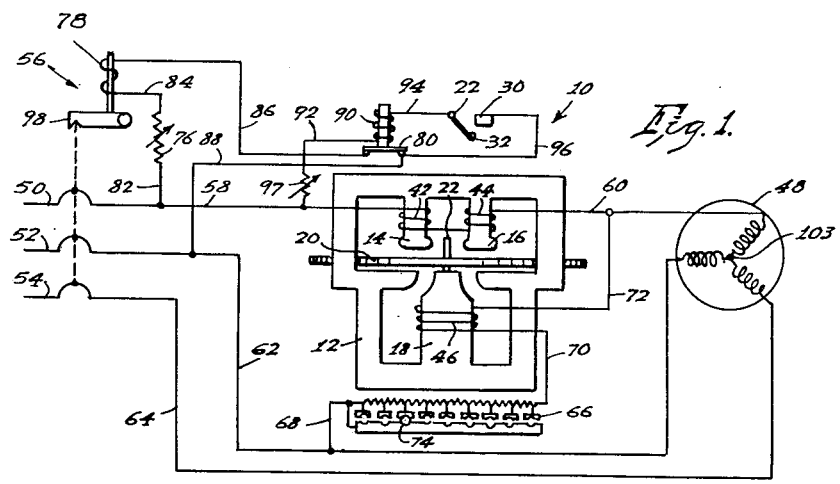
FIGURE 1 is a schematic representation of the improved relay shown in conjunction with the power supply of a three-phase induction motor and a circuit breaker for the motor.
Figure 2:
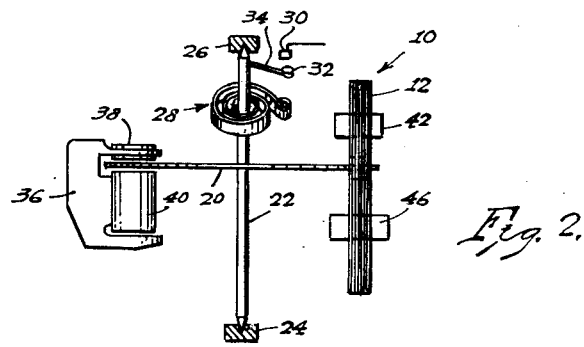
FIGURE 2 is a view in side elevation of the relay with parts broken away and parts schematically shown.

Referring to FIGURES 1 and 2, the numeral 10 designates generally an induction power relay which is comprised of a conventional laminated core 12 that includes a pair of depending pole pieces 14 and 16 and an upstanding pole piece 18. In the conventional manner, the upper end of the pole piece 18 terminates in vertically spaced relation below the lower ends of the pole pieces 14 and 16 to accommodate an outer peripheral portion of a disc 20 therebetween. The disc 20 is mounted for rotation about a central vertical axis, the same being supported by a central shaft 22 that has its opposite ends journaled for rotation in suitable conventional bearing members 24 and 26.

Conventional spiral spring means designated generally at 28 are provided for yieldingly urging rotation of the disc 20 towards an adjustably preselected, neutral angular position. Such means are conventional in the prior art, and accordingly it is believed that the simplified illustration of the same shown in FIGURE 2 will suffice for those skilled in the art, it being understood that the spiral spring is twisted about a horizontal axis from its normal position for better illustration of the same.

A normally open, electrical switch means is associated with the discs 20 such that for a predetermined rotation of the disc 20 from its neutral position defined by the adjustment of the spring means 28, such switch means is closed. Such switch means and its association with the disc 20 is schematically illustrated in FIGURE 2, the same comprising a fixed contact 30 and a movable contact 32 engageable with the fixed contact 30 upon rotation of the disc 20 as the movable contact 32 is supported from the shaft 22 by an arm 34.

Conventional magnetic damping means is provided for opposing rotation of the disc 20, such means comprising a permanent magnet 36 having spaced pole pieces 38 and 40 between which a peripheral portion of the disc 20 is disposed. The arrangement is such that rotation of the disc 20 between the pole pieces 38 and 40 induces eddy currents in the disc that oppose such rotation of the disc. A pair of series connected current coils 42 and 44 are wound respectively upon the pole pieces 14 and 16 in such a manner that a flow of current in one direction through such coils produces unlike magnetic polarities at the lower ends of the pole pieces. A conventional voltage coil 46 is wound upon the lower pole piece 18.

The structure thus far described is entirely conventional and can be considered specifically representative of a large variety of induction power relays commercially available that lend themselves to the practice of the present invention. An alternating current electrical system including the conventional power relay 10, a reactive load, and circuit interrupting means in accordance with the principles of the subject invention will now be described.

The numeral 48 designates a three-phase induction motor which it can be assumed is coupled to a load of substantially constant value. For example, the motor 48 can be considered as the prime mover for an oil-well pumping assembly, not shown, it being characteristic of an oil-well pumping assembly that the power requirements thereof remain substantially constant during uniform speed of operation so long as the oil well has not been pumped off, that is, not temporarily exhausted of oil, and so long as no mechanical component of the power train in the pump assembly, such as a pump rod, breaks. It is important in the interest of conserving power to discontinue the pumping operation when the well has been pumped off, and it is virtually essential that the prime mover be shut off when a mechanical component of the power train of the pump assembly has broken because of the serious likelihood of great mechanical damage to the well being caused by continued faulty operation of a broken pumping assembly. Accordingly, assuming that the motor 48 is employed as a prime mover for an oil-well pumping assembly, it is of great importance that whenever the load carried by the motor 48 falls below the normal substantially constant power requirements of its load that the motor 48 be de-energized.

Electrical leads 50, 52, and 54 constitute a three-phase source of alternating current which are connected to circuit breaker means indicated generally at 56. The lead 50 is connected from the circuit breaker to the motor 48 in series with the current coils 42 and 44 by means of leads 58 and 60. From the circuit breaker connection, the lead 52 is connected to the motor 48 by a lead 62, and from the circuit breaker connection, the lead 54 is connected to the motor 48 by a lead 64.

An adjustable resistor 66 of conventional character that is essentially noninductive relative to the voltage coil 46 is connected in series with the voltage coil 46 between the power leads 60 and 62 of the motor 48 by means of leads 68, 70, and 72. Though the variable resistor 66 can be of any suitable type, it is preferred that the same be of the type schematically illustrated in FIGURE 1 whereby the resistance is adjustable by appropriately selecting the position in which to insert the conducting pin 74, as will be understood.

A circuit breaker actuating circuit is provided which comprises a variable resistor 76, solenoid 78, and a relay switch 80 connected in series between the power leads 58 and 62 by means of leads 82, 84, 86, and 88. The relay switch 80 is normally closed and a solenoid 90 is provided for opening the switch 80 whenever the switch comprised of the contacts 30 and 32 are closed, the solenoid 90 being connected in series with the contacts 30 and 32 between the leads 58 and 88 by leads 92, 94, and 96. A variable resistor 97 is interposed in the lead 92. The operation of the circuit breaker 56 and the actuating circuit therefor is as follows. The circuit breaker means 56 includes a conventional latch element 98 that in its latching position prevents opening of the circuit breaker. The solenoid 78 when energized holds the latch element 98 in its latching position. With the switch 80 in its normally closed position, the solenoid 78 is energized so that the circuit breaker means 56 remains closed; however, closure of the contacts 30 and 32 energizes solenoid 90 to open the switch 80 thereby de-energizing the solenoid and releasing the latch element 98 so that the circuit breaker means 56 opens through the action of conventional spring means (not shown). The resistor 76 can be set to adjust the current in coil 78 for various voltages between leads 50 and 52. The resistor 97 can be similarly set to adjust the current in coil 90.

Figure 3:
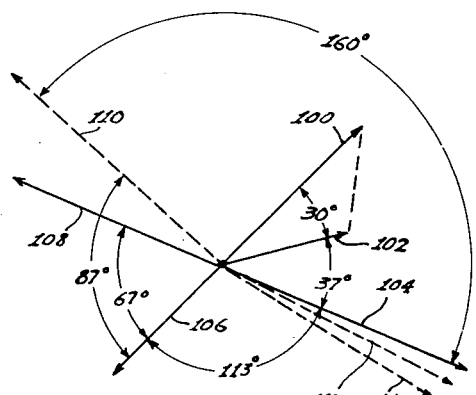
FIGURE 3 is a vector diagram showing the relationships of certain electrical quantities associated with the relay of FIGURE 1.

Upon appropriate adjustment of the resistance of the resistor 66 in relation to the normal power consumption by the motor 48, the contacts 30 and 32 can be caused to close and thereby open the circuit breaker means 56 upon the power consumption by the motor 48 falling a predetermined amount below the normal power consumption. Appreciation of the appropriate relationship between the resistance of the resistor 66 and the power consumption by the induction motor 48 will be had upon reference to the vector diagram of FIGURE 3. The vectors show merely the phase relationships of the electrical quantities they represent and do not represent the magnitude of such electrical quantities. The vector diagram was prepared in connection with a conventional (Westinghouse) type CW relay modified as previously described, such relay having a current rating of 30 amperes at 220 volts. The modified relay was associated with an induction motor as previously described, such motor being a 7.5 H.P., 3-phase, 220 volt induction motor. The motor had the following characteristics:

| H.P. | Load, percent | Current, amperes | Power factor | Power factor angle, ° lag |
|---|---|---|---|---|
| 7.5 | 100 | 28 | .80 | 37.0 |
| 5.6 | 75 | 22 | .76 | 40.5 |
| 3.7 | 50 | 17 | .69 | 46.0 |

The vector designated 100 represents the voltage between the power leads 50 and 52, while the vector designated 102 represents the voltage between the lead 50 and the neutral connection 103 of the motor 48 relative to the voltage represented by the vector 100, it being noted that the voltage 102 lags the voltage 100 by 30 degrees. The vector 104 represents the current in the current coils 42 and 44, it being noted that the current 104 lags the voltage 102 by 37° under full-load condition of the motor. The phase of the voltage in the voltage coil 46 is represented in the vector diagram by the vector 106, the direction of the same being shown as directly opposed or 180° out of phase with the voltage between the leads 50 and 52 as represented by the vector 100. Accordingly, in the vector diagram, the vector 106 representing the voltage in the coil 46 lags the current in the current coils 42 and 44 by 113°. The resistance of the resistor 66 is so adjusted with respect to the inductance and resistance of the voltage coil 46 that the vector 108 representing the current in the voltage coil 46 lags the voltage represented by the vector 106 to such an extent that the vector 108 is directly opposed to or 180° out of phase with the vector 104 representing the current in the current coils 42 and 44. In this instance, the vectors 108 and 104 are directly opposed or 180° out of phase when the motor is under a full load as the resistor 66 has such a value that the vector 108 lags the vector 106 by 67°. A dashed line vector 110 represents the position that the vector 108 would occupy if the resistance value of the resistor 66 were zero, it being noted that the vector 110 lags the vector 106 by 87° placing the vector 110 an angle of 160° from the vector 104 rather than the desired 180°. It is characteristic of the type relay shown in FIGURE 1 that the torque imposed upon the disc 20 as a result of current flowing through the current coils 42 and 44 and the voltage coil 46 has a magnitude proportional to the product of such currents multiplied by the sine of the phase angle between such currents. Thus, as will be apparent upon inspection of the vector diagram shown in FIGURE 3, the torque imposed upon the disc 20 when the motor is under full load is zero inasmuch as the currents in the current coils 42 and 44 and the voltage coil 46 are 180° out of phase. On the other hand, if the resistor 66 were omitted, the disc 20 would be subjected to a torque having a numerical value 34.2 percent of that which would be the case if such currents were 90° out of phase, that is, the maximum torque that could be produced. Furthermore, such torque would be in a direction that would tend to rotate the relay backward, that is, in the same direction as the retaining spring will normally urge the relay.

For a given relay and inductive load, the value of the resistance that the resistor 66 should be adjusted to have can be easily computed in view of the desideratum by those skilled in the art. For example, with the particular relay and load combination described above, the vector 108 must lag the vector 106 by 67°. Therefore, letting the inductance of the voltage coil 46 equal 100 percent and assuming the resistance of the coil 46 to be 5 percent, then the impedance of the voltage coil 46 is equal to approximately 100 percent. In order that the phase angle between the vectors 106 and 108 be 67°, assuming the inductance of the voltage coil circuit to be 100 percent, the total resistance of such circuit must be 42.4 percent, and since the resistance of the coil 46 is assumed to be 5 percent, the resistance of the resistor 66 should be 42.4 percent minus 5 percent or 37.4 percent resistance in order to place the vector 108 out of phase 180° with the vector 104. It should also be noted that in this case, the addition of 37.4 percent resistance in the voltage coil 46 circuit by adjustment of the resistor 66 increases the impedance of such circuit from 100 percent to approximately 108.5 percent; a net increase of 8.5 percent. Such a relatively small increase in the impedance of the voltage coil circuit does not greatly reduce the maximum torque that is produced upon the disc 20 as such torque will at least be in excess of 92 percent of the maximum that would otherwise be obtained if the impedance of the voltage coil circuit were not increased.

In view of the foregoing, the inclusion of a resistance having a value sufficient to make the sine of the angle between the vectors 108 and 104 have a zero value results in no torque tending to rotate the disc 20 in either direction when the motor 48 is operating under full load with the disc being subjected to a negative torque when the load on the motor 48 is in excess of full load, and with the torque being positive (that is in a direction causing the contact 32 to move towards the contact 30) when the load carried by the motor 48 falls below full-load value. Referring again to the vector diagram of FIGURE 3, the numerals 112 and 114 respectively designate the position occupied by the vector 104 upon the load carried by the motor 48 dropping to 75 percent of full load and to 50 percent of full load. It will be appreciated that as the torque imposed upon the disc 20 is proportional to the sine of the angle between the vectors 104 and 108, that the rate of change of torque with angular movement of the vector 104 is proportional to the cosine of the angle between the vectors 104 and 108. Accordingly, with the resistance of the resistor 66 being of such a value that the sine of the angle between the vectors 104 and 108 is zero when the motor 48 is operating under a normal operating condition, say full load, the maximum rate of variation in the torque produced upon the disc 20 is obtained when the motor 48 is operating under such normal load. Therefore, the relay is of optimum sensitivity with respect to diminution in the load carried by the motor 48.

As mentioned previously, the spring means 28 are adjustable in the conventional manner, and can be adjusted so that the contacts 30 and 32 cannot contact each other unless the torque imposed upon the disc 20 exceeds a value determined by the adjustment of the spring means 28. Also, in the conventional manner, the magnetic damping means 36, 38, and 40 can be selected of such a strength or positioned relative to the disc 20 in such a manner that the time required for the disc 20 to rotate sufficiently for the contacts 30 and 32 to close for a given torque on the disc 20 can be predetermined.

Inasmuch as the illustrated and described embodiment of the invention is subject to numerous variations without departing from the spirit of the invention, attention is directed to the appended claims in order to determine the actual scope of the invention.

I claim:
1. In an alternating current electrical system of the class wherein the voltage coil of an induction power relay is connected between a pair of power leads of an inductive load and the current coil of the relay is in series with a power lead of the load, with the relay including a disc subject to a torque equal in magnitude and sense to the product of the currents in the coils and the sine of the phase angle between the currents, the combination with means in series with the voltage coil that causes the sine of the phase angle between the currents in the coils to be substantially zero upon a normal rate of power consumption by inductive load, and means for interrupting the supply of power to the load upon the disc being subjected to a torque corresponding to the power consumption by the load being reduced a fixed amount below the normal rate of power consumption for a set interval of time, said last means comprising a switch operatively connected to the disc that closes upon the disc rotating a given amount in the direction resulting from torque applied to the disc upon increased current lag in the current coil and a spring opposing such rotation.

2. Apparatus for interrupting the supply of power to an inductive load when the power consumption of the inductive load drops below a normal rate comprising an inductive power relay having a voltage coil connected between a pair of power leads of the inductive load and a current coil connected in series with a power lead of the inductive load, said relay including a rotatable disc subject to a torque equal in magnitude and sense to the product of the currents in the coils and the sine of the phase angle between the currents, means in series with the voltage coil for adjusting the sine of the phase angle between the currents in the coils to substantially zero on a normal rate of power consumption by the inductive load, a switch operatively connected to the disk, a solenoid operated circuit breaker adapted to interrupt the supply of power to the inductive load, leads connecting the solenoid of the circuit breaker between a pair of power leads to the inductive load, solenoid operated switching means in one of the leads to the solenoid of the circuit breaker, and leads connecting the solenoid operated switching means between a pair of power leads to the inductive load, said switch operatively connected to the disk being connected in series with the solenoid operated switching means to control the current to said switching means, said switch being actuated by a torque applied to the disk upon reduced current flow to the load to operate said solenoid operated switching means and thereby actuate the solenoid operated circuit breaker.

3. Apparatus as set forth in claim 2 in which the means for adjusting the phase angle is a variable resistor.

References Cited in the file of this patent

UNITED STATES PATENTS

| | | |
|---|---|---|
| 1,714,940 | Biermanns | May 28, 1928 |
| 1,719,912 | Traver | July 9, 1929 |
| 1,870,518 | Leben | Aug. 9, 1932 |
| 2,513,957 | Ogurkowski | July 4, 1950 |
| 2,760,124 | Glassburn | Aug. 21, 1956 |